US008144720B2

(12) United States Patent
Koorapaty et al.

(10) Patent No.: US 8,144,720 B2
(45) Date of Patent: Mar. 27, 2012

(54) UPLINK RADIO RESOURCE ALLOCATION IN THE PRESENCE OF POWER LIMITED USERS

(75) Inventors: Havish Koorapaty, Cary, NC (US); Rajaram Ramesh, Raleigh, NC (US); Kumar Balachandran, Cary, NC (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 295 days.

(21) Appl. No.: 12/429,468

(22) Filed: Apr. 24, 2009

(65) Prior Publication Data

US 2010/0271963 A1  Oct. 28, 2010

(51) Int. Cl.
*H04Q 11/02* (2006.01)
(52) U.S. Cl. ..................................... 370/430
(58) Field of Classification Search .................. 370/430
See application file for complete search history.

(56) References Cited

U.S. PATENT DOCUMENTS

| | | | |
|---|---|---|---|
| 2002/0150048 A1* | 10/2002 | Ha et al. | 370/231 |
| 2002/0159422 A1* | 10/2002 | Li et al. | 370/342 |
| 2003/0063583 A1* | 4/2003 | Padovani et al. | 370/329 |
| 2005/0157805 A1* | 7/2005 | Walton et al. | 375/267 |
| 2005/0286440 A1* | 12/2005 | Strutt et al. | 370/253 |
| 2007/0230326 A1 | 10/2007 | Pandoh et al. | |
| 2009/0129375 A1* | 5/2009 | Mohanty et al. | 370/356 |

OTHER PUBLICATIONS

A Deficit Round Robin with Fragmentation Scheduler for IEEE 802.16e Mobile WiMAX, Proceedings of 2009 IEEE (Mar. 2009), by So-In etc.*
Safa, H. et al: "New Scheduling Architecture for IEEE 802.16 Wireless Metropolitan Area Network", Computer Systems and Applications, 2007. AICCSA '07. IEEE/ACS International Conference on, IEEE, PI, May 13, 2007.
So-In, C. et al: "A Deficit Round Robin with Fragmentation scheduler for IEEE 802.16e Mobile WiMAX", Sarnoff Symposium, 2009. Sarnoff '09. IEEE, IEEE, Piscataway, NJ, USA, Mar. 30, 2009.

* cited by examiner

*Primary Examiner* — Phirin Sam
*Assistant Examiner* — Hai-Chang Hsiung

(57) ABSTRACT

A base station in an OFDMA system which determines a modulation and coding scheme to use for a packet of a certain size to be transmitted by a Mobile Station. The base station schedules transmissions by mobile stations and transmits packets. The base station includes a processing unit which determines a number of time-frequency resources required to transmit the packet for a modulation and coding scheme, determines an SINR based on the number of time-frequency resources used and available power at the mobile station, determines a transmission rate as a ratio of the packet size transmitted to the number of time-frequency resources used, sets a rate to zero if the determined SINR is lower than a threshold SINR required for the modulation and coding scheme, and selects the modulation and coding scheme with a highest transmission rate. The base station includes a memory storing modulation and coding schemes.

8 Claims, 6 Drawing Sheets

UPLINK RADIO RESOURCE ALLOCATION IN THE PRESENCE OF POWER LIMITED USERS

TECHNICAL FIELD

The present invention is related to transmitting on an uplink in an OFDMA system. (As used herein, references to the "present invention" or "invention" relate to exemplary embodiments and not necessarily to every embodiment encompassed by the appended claims.) More specifically, the present invention is related to transmitting on an uplink at a transmission rate that is a function of allocation and a power limitation in an OFDMA system.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The invention addresses the problem of allocating radio resources on the uplink in an OFDMA system. In an OFDMA system, such as the uplink of IEEE 802.16e otherwise known as WiMAX, power control is typically employed to prevent large variations in received signal strength across frequency sub-carriers at the receiver. However, some fraction of user terminals in the cell may be in a disadvantaged situation whereby their maximum transmit power is lower than that required to meet the power control criterion. Such, user terminals are power-limited and simply transmit at maximum power. As the difference between the power required to meet the power control criterion and the maximum transmit power increases, the SINR for the user terminal reduces as well. In an OFDMA system, the bandwidth allocated to the user may be varied. Lowering the bandwidth allocated to power-limited user terminals improves their signal to impairment ratio resulting in a higher probability of error-free communication, albeit at a potentially lower rate. The number of bits per transmitted symbol is determined by the modulation and coding scheme (MCS). Each MCS has an SINR threshold above which the block error rate is lower than some pre-specified criterion. Given a requested number of bits to be transmitted by the user terminal, a radio resource allocation must be determined. The resource allocation consists of a specified number of slots and a specific MCS assignment to use in those slots. A slot is a time-frequency resource block with a number of slots concatenated in time forming a subchannel. The number of slots per subchannel depends on deployment parameters. For power-limited user terminals, the MCS assignment depends on the SINR, which depends on the number of subchannels assigned, which in turn depends on the number of bits to be transmitted and the MCS used. Thus, there is a circular interdependence among criteria used to decide the various components of the radio resource allocation in the uplink of an OFDMA system. This leads to the following observations:

1. For some packet sizes, there are cases where a MCS corresponding to a higher transmission rate is always more beneficial to use than one corresponding to a lower transmission rate.
2. Fragmentation of packets that are not delay-sensitive allows optimizations leading to greater spectral efficiency.

This invention solves the problem of allocating radio resources in such a system taking these factors into account.

BRIEF SUMMARY OF THE INVENTION

Determination of the modulation and coding scheme to be used for a certain uplink transmission is part of the functionality of a base station in an OFDMA system. In one embodiment of the present invention, the base station determines the best modulation and coding scheme used based on the number of bytes requested by the mobile station, the power constraint of the mobile station and the status of other packets awaiting transmission in the queue. The base station accounts for the variation of the per-subcarrier SINR based on the frequency bandwidth spanned by the allocation to the user when the transmit power available to the mobile station (MS) is limited.

In one embodiment of this invention, packets to be transmitted by an MS that has limited transmit power available are fragmented and transmitted across multiple transmission time intervals in order to achieve greater transmission efficiency. When scheduling of bandwidth for the uplink is carried out by the base station or network node, it is determined whether fragmenting the packet leads to fewer used resources by the MS due to the power limitations. Fragmentation in this manner is used only when the system load is high and there are other packets waiting in queue that may be transmitted in the resources freed up by using fragmentation. Further, scheduling of packets using fragmentation is done while ensuring that the delay constraints on the delivery of the packet are met.

In one embodiment, there is a base station (BS) in an OFDM system which determines a modulation and coding scheme to use for a packet of a certain size to be transmitted by a Mobile Station (MS). The base station comprises a processing unit which determines a number of time-frequency resources required to transmit the packet for a modulation and coding scheme, determines an SINR based on the number of time-frequency resources used and available power at the mobile station, determines a transmission rate as a ratio of the packet size transmitted to the number of time-frequency resources used, sets a rate to zero if the determined SINR is lower than a threshold SINR required for the modulation and coding scheme, and selects the modulation and coding scheme with a highest transmission rate. The base station comprises a memory storing modulation and coding schemes.

In one embodiment, there is a base station in an OFDM system to schedule transmissions by mobile stations. The base station comprises a processing unit which determines a modulation and coding scheme and number of time-frequency resources occupied by a packet if it is to be transmitted by a mobile station in one transmission time interval, which determines modulation and coding schemes and total number of time-frequency resources occupied by the packet if it is fragmented and transmitted over two or more transmission time intervals, and schedules transmission over the number of transmission time intervals occupying a least number of time-frequency resources. The base station comprises a memory in which the modulation and coding schemes are stored.

In one embodiment, there is a base station to schedule transmissions by mobile stations. The base station comprises at least one queue for storing packets. The base station comprises a processing unit which makes a determination regarding a duration in terms of a number of frames starting with a current frame within which a packet must be transmitted and marks packets for which the duration is below a threshold as delay-sensitive packets, which schedules all delay sensitive packets, which schedules non-delay sensitive packets if time-frequency resources are still available, determines if all time-frequency resources are occupied and if there are more packets waiting in the queue which indicates high system load, determines in high system load conditions if fragmenting any of the non-delay sensitive packets can reduce the number of resources used for the non-delay sensitive packet, and fragments packets that may be transmitted with fewer resources and uses the resulting unoccupied time-frequency resources to schedule more packets.

In one embodiment, there is a mobile station which transmits packets. The mobile station comprises a queue for storing packets. The mobile station comprises a processing unit which fragments most delay-sensitive packets if a size of the resources allocated by the base station is less than required resources for any of the packets in the queue using a modulation and coding scheme specified by the base station. The mobile stations comprises a network interface which transmits the most delay-sensitive packets in resources allocated by a base station. The processing unit uses packing and fragmenting to send the most delay-sensitive packets to transmit in the resources allocated by the base station if the size of the resources allocated by the base station is more than the required resources for at least one of the packets in the queue using the modulation and coding scheme specified by the base station. The network interface transmits the most delay sensitive packets in the resources allocated by the base station if the resources allocated by the base station match the size of the resources required to transmit one or more delay-sensitive packets using the modulation and coding scheme specified by the base station In one embodiment, there is a method in an OFDM system to determine a modulation and coding scheme to use for a packet of a certain size to be transmitted by a Mobile Station (MS). The method comprises the steps of determining with a processing unit a number of time-frequency resources required to transmit the packet for a modulation and coding scheme. There is the step of determining with the processing unit an SINR based on the number of time-frequency resources used and available power at the mobile station. There is the step of determining with the processing unit a transmission rate as a ratio of the packet size transmitted to the number of time-frequency resources used. There is the step of setting with the processing unit a rate to zero if the determined SINR is lower than a threshold SINR required for the modulation and coding scheme. There is the step of selecting with the processing unit the modulation and coding scheme with a highest transmission rate.

In one embodiment, there is a method for a base station in an OFDM system to schedule transmissions by mobile stations. The method comprises the steps of determining with a processing unit a modulation and coding scheme and number of time-frequency resources occupied by a packet if it is to be transmitted by a mobile station in one transmission time interval. There is the step of determining with the processing unit modulation and coding schemes and total number of time-frequency resources occupied by the packet if it is fragmented and transmitted over two or more transmission time intervals. There is the step of scheduling with the processing unit transmission over the number of transmission time intervals occupying a least number of time-frequency resources.

In one embodiment, there is a method for a base station to schedule transmissions by mobile stations. The method comprises the steps of making a determination by a processing unit regarding a duration in terms of a number of frames starting with a current frame within which a packet must be transmitted and marking packets for which the duration is below a threshold as delay-sensitive packets. There is the step of scheduling all delay sensitive packets with the processing unit. There is the step of scheduling non-delay sensitive packets with the processing unit if time-frequency resources are still available. There is the step of determining with the processing unit if all time-frequency resources are occupied and if there are more packets waiting in a queue which indicates high system load. There is the step of determining with the processing unit in high system load conditions if fragmenting any of the non-delay sensitive packets already scheduled can reduce the number of resources used for the non-delay sensitive packet. There is the step of fragmenting, with the processing unit, packets that may be transmitted with fewer resources and using the resulting unoccupied time-frequency resources to schedule more packets.

In one embodiment, there is a method for a mobile station to transmit packets. The method comprises the steps of fragmenting with a processing unit most delay-sensitive packets to transmit with a network interface in resources allocated by a base station if a size of the resources allocated by the base station is less than required resources for any of the packets in a queue using a modulation and coding scheme specified by the base station. There is the step of using packing and fragmenting by the processing unit to send the most delay-sensitive packets to transmit in the resources allocated by the base station if the size of the resources allocated by the base station is more than the required resources for at least one of the packets in the queue using the modulation and coding scheme specified by the base station. There is the step of transmitting with the network interface the most delay sensitive packets in the resources allocated by the base station if the resources allocated by the base station match the size of the resources required to transmit one or more delay-sensitive packets using the modulation and coding scheme specified by the base station.

BRIEF DESCRIPTION OF THE DRAWINGS

In the accompanying drawings, the preferred embodiment of the invention and preferred methods of practicing the invention are illustrated in which.

DETAILED DESCRIPTION OF THE INVENTION

Figure 1:
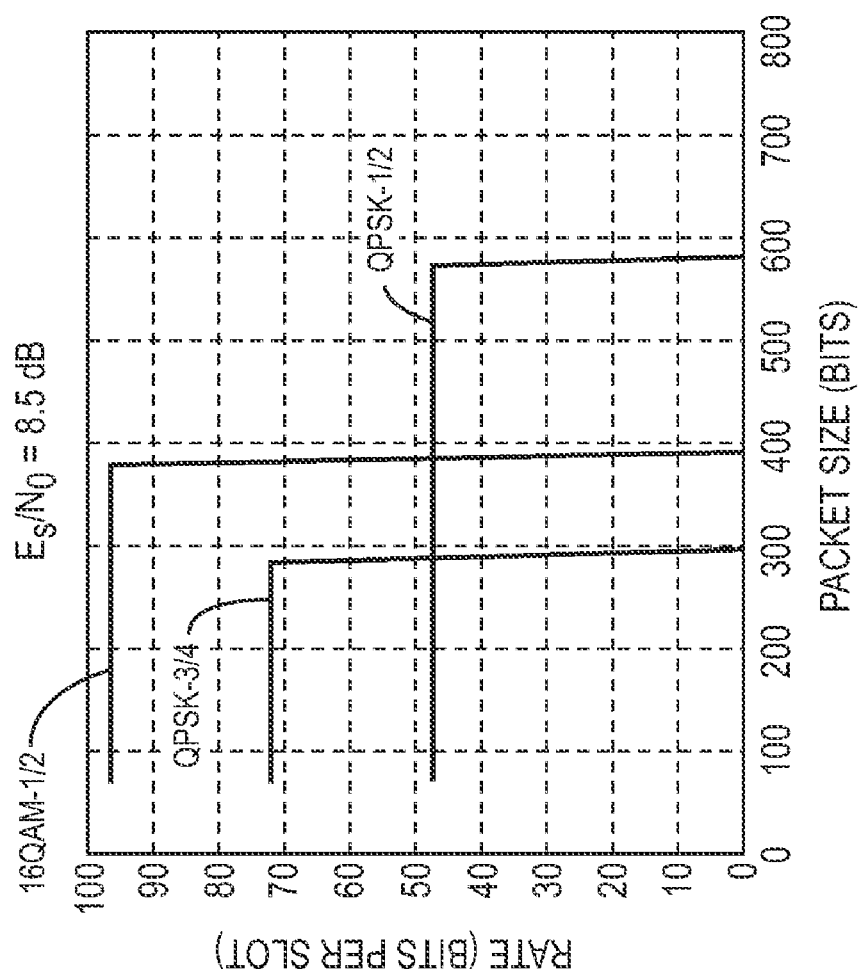
FIG. 1 shows the rate of transmission that may be achieved for various modulation and coding schemes as a function of packet size at a fixed SNR.

In an OFDM system such as IEEE 802.16e, bandwidth requests by the mobile station (MS) are made in terms of the number of bytes requested for transmission in a MAC protocol data unit (PDU). Each bandwidth request is in relation to a connection identifier (CID) that has a one-to-one relationship with a service flow ID (SFID) which is associated with a quality of service (QoS) parameter set. Thus, the BS has information on the QoS corresponding to each bandwidth request so that the delay constraints of various requests are known. However, when a bandwidth grant is made to an MS, it is associated with the basic management CID for the MS and not with individual CIDs for various user data service flows. Thus, the MS may choose to use the granted bandwidth allocation for any of the service flows being supported by it. It should be noted that the BS may obtain information regarding the maximum available power and current transmitted power at the MS through control messages.

In the operation of the invention, the main aspects of the invention are described below:

Packets that are not delay-sensitive are fragmented so as to decrease the number of total radio resources occupied by the packet and thereby increase the spectral efficiency of the system. Packets that may be ordinarily packed or concatenated for transmission in a single frame are transmitted in separate frames to increase spectral efficiency.

Fragmentation or transmission of packets that may be packed or concatenated in separate frames is used only when there are more packets in the queue 16 than can be transmitted in current frame, i.e., when the load is high.

Packets in the queue 16 that are not delay-sensitive may be transmitted out of order to increase spectral efficiency.

A procedure to be followed at the BS is described that selects the MCS for an uplink transmission of a packet of fixed size, taking into account the effects of the number of used sub-carriers on SINR. The fact that for certain packet sizes the selection of a higher rate MCS may be more beneficial is incorporated into the procedure. The redundancy of certain MCS options for some packet sizes is taken into account.

An embodiment of a scheduling algorithm to be executed at the BS that takes into account all of the above factors is provided.

A procedure to be followed at the MS to choose packets for transmission given a bandwidth allocation from the BS is described. The procedure is integral to realizing the spectral efficiency gains achievable at high loads by the use of fragmentation and transmission of packets in separate frames.

In the following, a packet is defined as being delay-sensitive if the packet has to be delivered in the current frame. Packets that don't have such a requirement are considered to be non-delay-sensitive so that they may be scheduled in this frame or a subsequent frame. The requirement regarding transmission in the current frame is determined after taking into account the requirements for delivery at the higher layer at the BS, processing delays, etc. Thus, if processing and other delay constraints amount to 2 frames and the data must be sent to the higher layer in frame N, the packet becomes delay-sensitive at frame N-2.

It an embodiment of this invention that when a packet to be transmitted by a power limited user is not delay-sensitive, it may be fragmented in order to transmit the bits in a more spectrally efficient manner. As an example, consider a power limited user with an uplink SNR of 8.5 dB if all power is concentrated on one subchannel. The user needs to transmit a packet that is 576 bits long on the uplink of a WiMAX system configured with a 35:12 downlink to uplink ratio (DL/UL ratio). The 35:12 DL/UL ratio indicates that out of a total of 47 symbols in the frame (excluding the transmit and receive time gaps), 35 are allocated to the DL and 12 are allocated to the UL. The permutation of sub-carriers that forms a subchannel is considered to be PUSC which is the default permutation in a WiMAX system. In this permutation, three symbols in time and one sub-channel in frequency form a "slot" with each slot containing 48 sub-carriers.

FIG. 1 shows the rate that can be obtained in terms of bits per slot by each MCS as a function of packet size under the considered power constraint. The rate for each MCS is a binary variable, with the rate being zero if the required SNR is higher than the current SNR and a fixed value depending on the modulation order and code rate otherwise. For any given packet size, the MCS with the best rate should be chosen. The rate drops to zero for each MCS when the packet size grows beyond a certain threshold due to an increase in the number of subchannels beyond the limit supportable by the MCS. For example, in the scenario considered in FIG. 1, 16 QAM rate-½ can only support the use of one subchannel. If the number of subchannels is increased to 2, the SNR drops by 3 dB to 5.5 dB which is too low for 16 QAM rate-½. Thus, the block error rate exceeds a desirable threshold (typically 10%) and the rate that can be supported while meeting the block error rate criterion drops to zero. With one subchannel, the maximum packet size that may be supported in one subchannel, i.e., 4 slots is 96*4=384. Hence, the figure shows that when the packet size exceeds 384 bits, the supportable rate for the 16 QAM rate-½ MCS drops to zero. The figure similarly reflects limitations due to power constraints for the other MCS' as well.

It is clear from FIG. 1 that the 576 bit packet in the scenario considered above would have to be transmitted using three subchannels and the QPSK rate-½ modulation and coding scheme. This would require a total of 576/48=12 slots. Now consider fragmentation of the packet into two parts. This would require the transmission of an additional 48-bit general MAC header (GMH) and two 13-bit fragmentation sub-headers (FSH). Thus, we would need to transmit 48+2*13=74 additional bits or a total of 576+74=650 bits. Since this is not a multiple of 8 we would need to transmit 6 additional padding bits, resulting in 656 total bits requiring transmission. To transmit this as two fragments, we may split this into two parts, one with 384 bits, transmitted in the current frame, and the other with 272 bits, transmitted in a subsequent frame. It is clear from FIG. 1 that both the transmissions can use a MCS of 16-QAM rate-½, assuming that the SNR does not change in the subsequent frame. The first transmission would require 384/96=4 slots and the second transmission would require ceil (272/96)=3 slots. Thus, the original payload of 576 bits may be transmitted in a total of 7 slots including the overhead induced by fragmentation. Thus, fragmentation leads to a saving of 5 slots, i.e., a gain of 5/12=41.67% in spectral efficiency.

It should be noted that gains in spectral efficiency are obtained not just by fragmenting a single packet but also when multiple packets requiring transmission are transmitted in separate frames instead of being packed or concatenated together. Packing is achieved when multiple service data units (SDUs) from the higher layer are packed into a single protocol data unit (PDU). When concatenation is used, multiple PDUs are concatenated and sent in a single coded block. Thus, spectral efficiency may be enhanced in some cases, when the scheduler decides not to pack or concatenate packets together.

In order to maximize system throughput, fragmentation or transmission of packets that may be potentially concatenated in separate frames is only desirable under high load conditions. That is, it is useful to use fewer slots and postpone transmission of a fragment of a packet or a few of many packed packets if the slots that have been freed up can be used by other users. Under low load conditions where there are no other users to take advantage of the empty slots, this is unnecessary. It should be noted that fragmentation may be essential even in low load conditions if the MS is severely coverage limited. However, in this scenario, fragmentation is not one of many options, but the only option.

Figure 2:
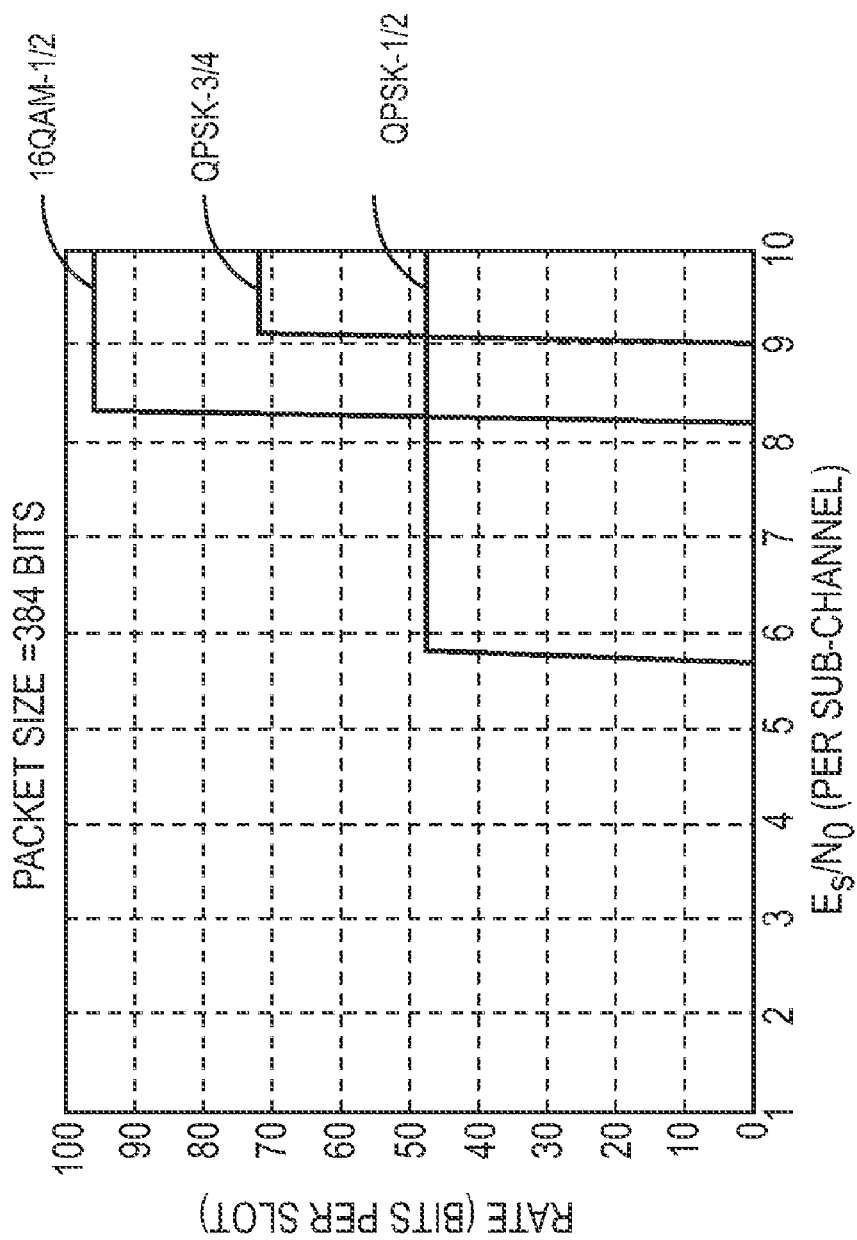
FIG. 2 shows the rate of transmission that may be achieved for various modulation and coding schemes as a function of SNR for a fixed packet size.

FIG. 2 shows another interesting property for power-limited users on the OFDMA uplink, i.e., some MCS may not be used at all in certain SNR and packet size ranges. For the SNR of 8.5 dB considered in the figure, assuming transmission on a single subchannel, it is clear that the QPSK rate-¾ MCS does not get used for any packet size. When the packet size is below approximately 390 bits, the best MCS to use is 16 QAM rate-½ and when the packet size is above 390 bits, it is best to use QPSK rate-½. However, this may not be the case at all SNRs. The same property may be viewed from a different viewpoint as shown in FIG. 2. The figure shows the rates in terms of bits per slot achievable for the same three MCS considered earlier as a function of the SNR assuming transmission over a single sub-channel. The packet size is assumed to be 384 bits. It can be seen from the figure that the QPSK rate-¾ MCS would never be used for this packet size.

When the user is not power-limited, the above observations don't hold true, i.e., the threshold SNR beyond which an MCS becomes viable to use increases according to the rate achievable by the MCS. In an embodiment of this invention, power-limited users are scheduled on the uplink after taking into account the effects captured in FIGS. 1 and 2.

Figure 3:
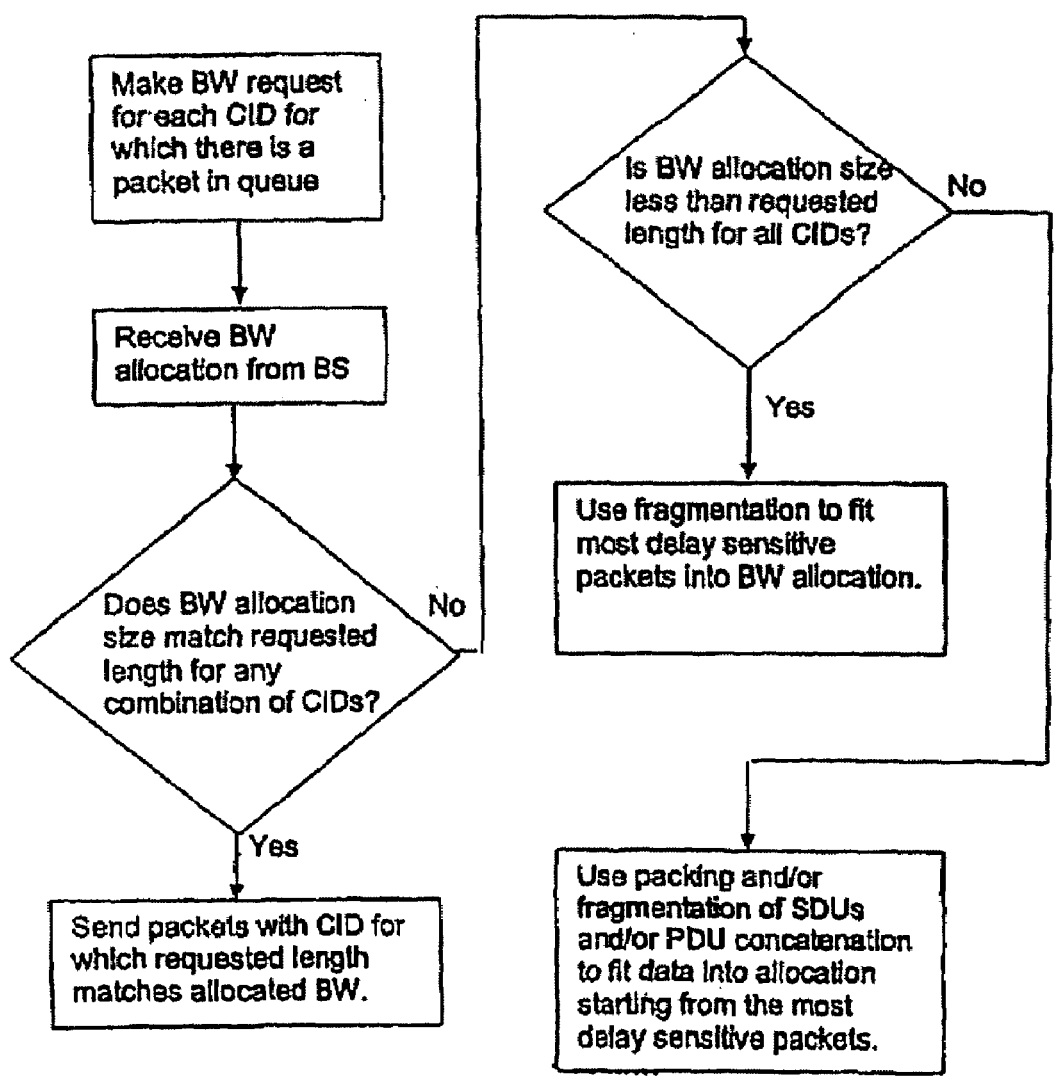
FIG. 3 shows procedures at the MS according to invention.
Figure 6:
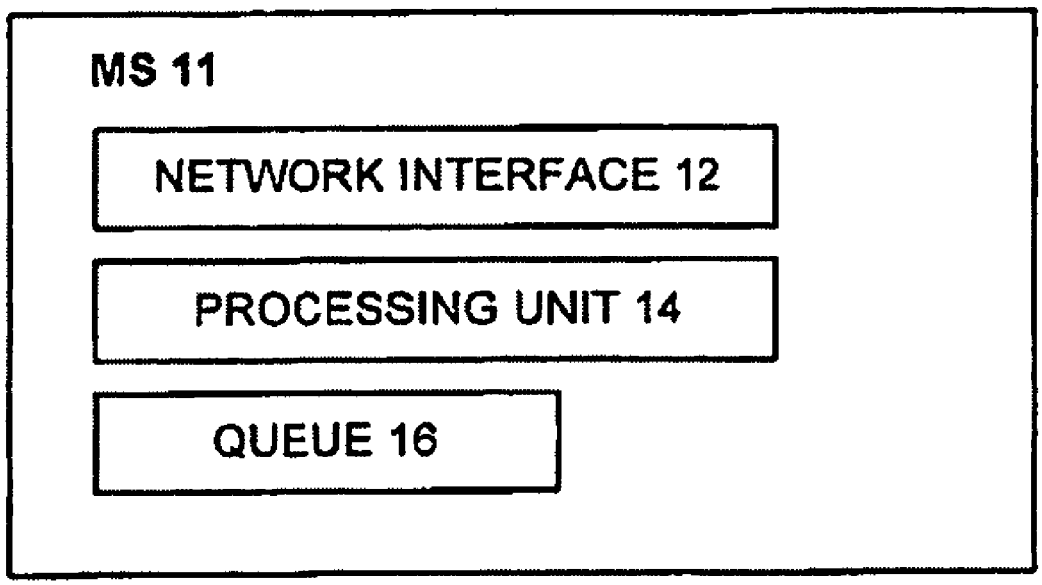
FIG. 6 is a block diagram of an MS of the present invention.

In one embodiment, there is a mobile station 11 which transmits packets, as shown in FIGS. 3 and 6. The mobile station 11 comprises a queue 16 for storing packets. The mobile station 11 comprises a processing unit 14 which fragments most delay-sensitive packets. The mobile station 11 comprises a network interface 12 which transmits the most delay-sensitive packets in resources allocated by a base station 10 if a size of the resources allocated by the base station 10 is less than required resources for any of the packets in the queue 16 using a modulation and coding scheme specified by the base station 10. The processing unit 14 uses packing and fragmenting to send the most delay-sensitive packets to transmit in the resources allocated by the base station 10 if the size of the resources allocated by the base station 10 is more than the required resources for at least one of the packets in the queue 16 using the modulation and coding scheme specified by the base station 10. The network interface 12 transmits the most delay sensitive packets in the resources allocated by the base station 10 if the resources allocated by the base station 10 matches the size of the resources required to transmit one or more delay-sensitive packets using the modulation and coding scheme specified by the base station 10.

In one embodiment, there is a method for a mobile station 11 to transmit packets, as shown in FIGS. 3 and 6. The method comprises the steps of fragmenting with a processing unit 14 most delay-sensitive packets to transmit with a network interface 12 in resources allocated by a base station 10 if a size of the resources allocated by the base station 10 is less than required resources for any of the packets in a queue 16 using a modulation and coding scheme specified by the base station 10. There is the step of using packing and fragmenting by the processing unit 14 to send the most delay-sensitive packets to transmit in the resources allocated by the base station 10 if the size of the resources allocated by the base station 10 is more than the required resources for at least one of the packets in the queue 16 using the modulation and coding scheme specified by the base station 10. There is the step of transmitting with the network interface 12 the most delay sensitive packets in the resources allocated by the base station 10 if the resources allocated by the base station 10 match the size of the resources required to transmit one or more delay-sensitive packets using the modulation and coding scheme specified by the base station 10.

In the WiMAX system, bandwidth requests by the mobile station (MS) are made in terms of the number of bytes requested for transmission in a MAC protocol data unit (PDU). Each bandwidth request is in relation to a connection identifier (CID) that has a one-to-one relationship with a service flow ID (SFID) which is associated with a quality of service (QoS) parameter set. Thus, the BS has information on the QoS corresponding to each bandwidth request so that the delay constraints of various requests are known. However, when a bandwidth grant is made to an MS, it is associated with the basic management CID for the MS and not with individual CIDs for various user data service flows. Thus, the MS may choose to use the granted bandwidth allocation for any of the service flows being supported by it. It should be noted that the BS can obtain information regarding the maximum available power and current transmitted power at the MS through control messages.

The implication of the above properties of WiMAX is that, when a BS makes a scheduling decision that involves fragmentation of a packet as described above, it cannot explicitly communicate that decision to the MS. In the example used to illustrate the benefits of fragmentation, consider an MS that has two service flows, one which requires a transmission of 576 bits and another with the same or possibly different QoS requirements and requiring transmission of a different number of bits. Bandwidth requests are made for both service flows using their individual CIDs. The BS may decide to provide bandwidth in the current frame for only the first service flow and provide bandwidth for the second service flow in a frame occurring later. For the first service flow, the MS would request a bandwidth allocation for 576 bits, but the BS may decide that it is more efficient for the MS to transmit the 576 bit packet as two packets, one of length 384 bits and the other of length 272 bits. Thus, it may only allocate bandwidth for 384 bits. Since a CID is not specified for the allocation, the MS can use this reduced allocation in multiple ways. For example, it may choose to use it for the second service flow. In an embodiment of this invention, that when an MS detects that an allocation does not match any of its bandwidth requests, and the allocation cannot be completely utilized by concatenating packets in its queue 16, it will fragment one of its packets and transmit one fragment within the provided allocation. The fragmentation is done so that the transmitted fragment will completely utilize the provided allocation. Procedures at the MS according to above described aspects of this invention are shown in FIG. 3. The figure shows the use of packing and concatenation in addition to fragmentation in order to fill the bandwidth allocation.

Figure 4:
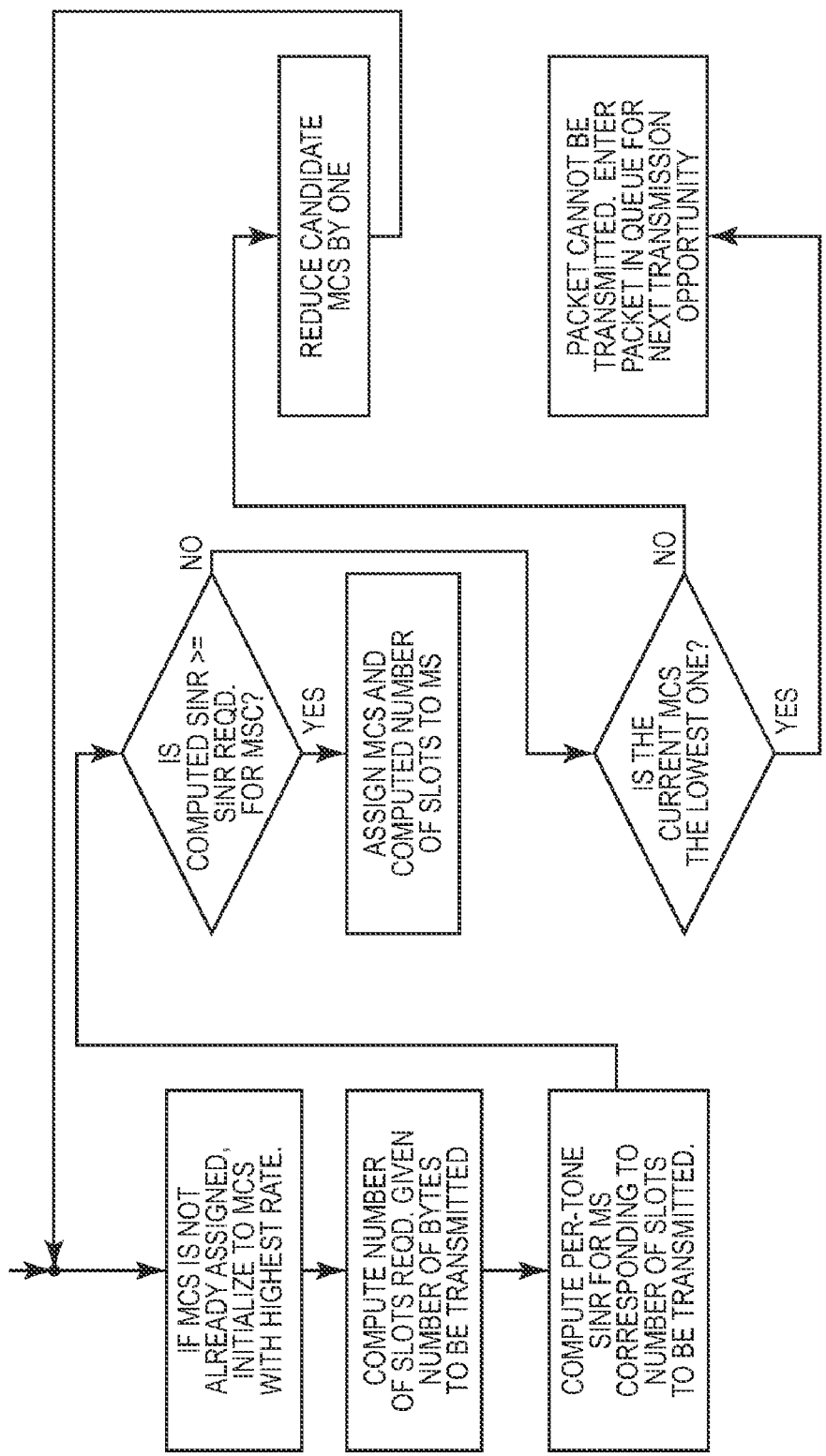
FIG. 4 shows procedures at the BS for modulation and coding scheme selection accounting for power constraints at MS.
Figure 5:
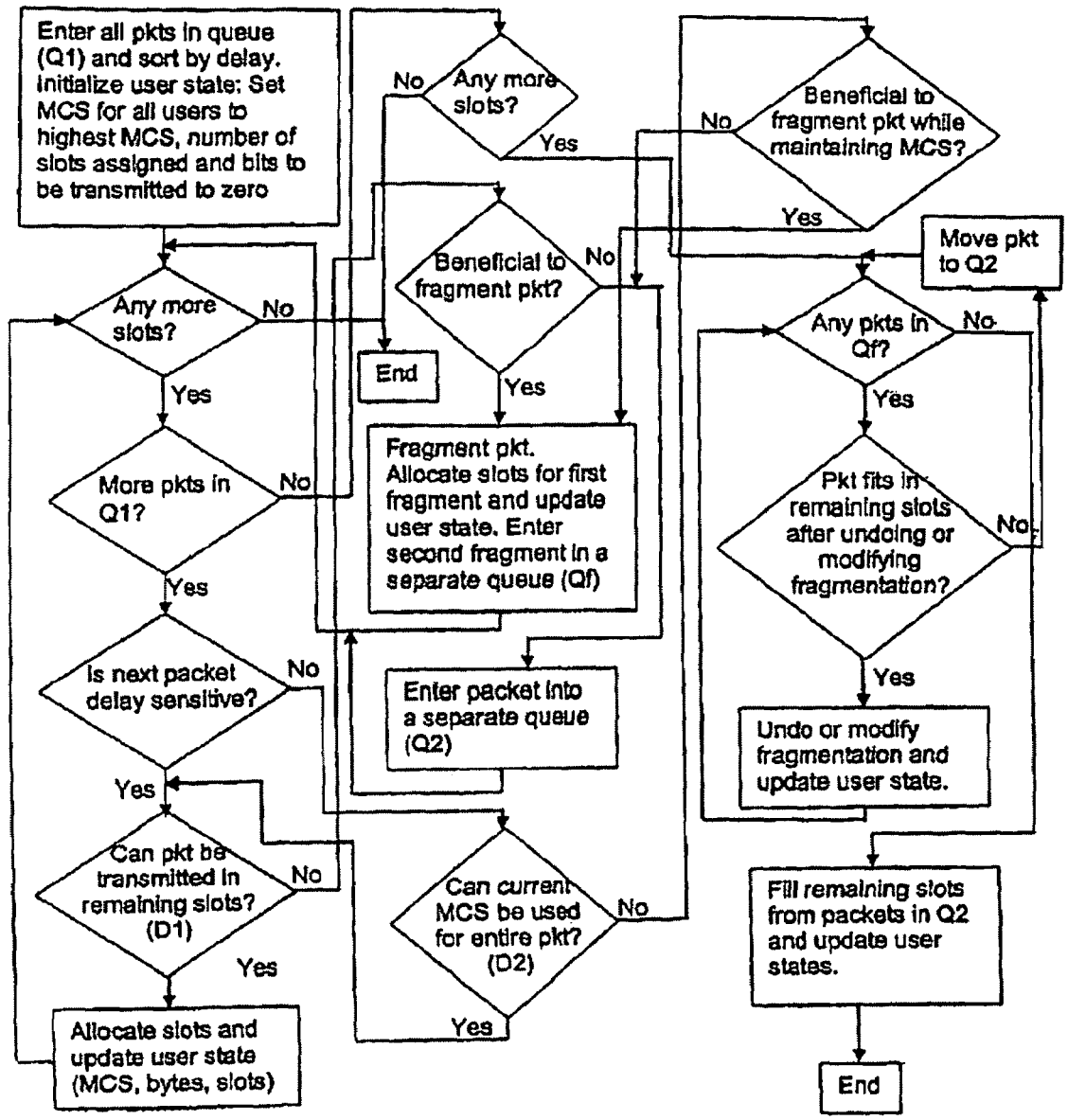
FIG. 5 shows an embodiment of a scheduling procedure at BS incorporating features of the invention.
Figure 7:
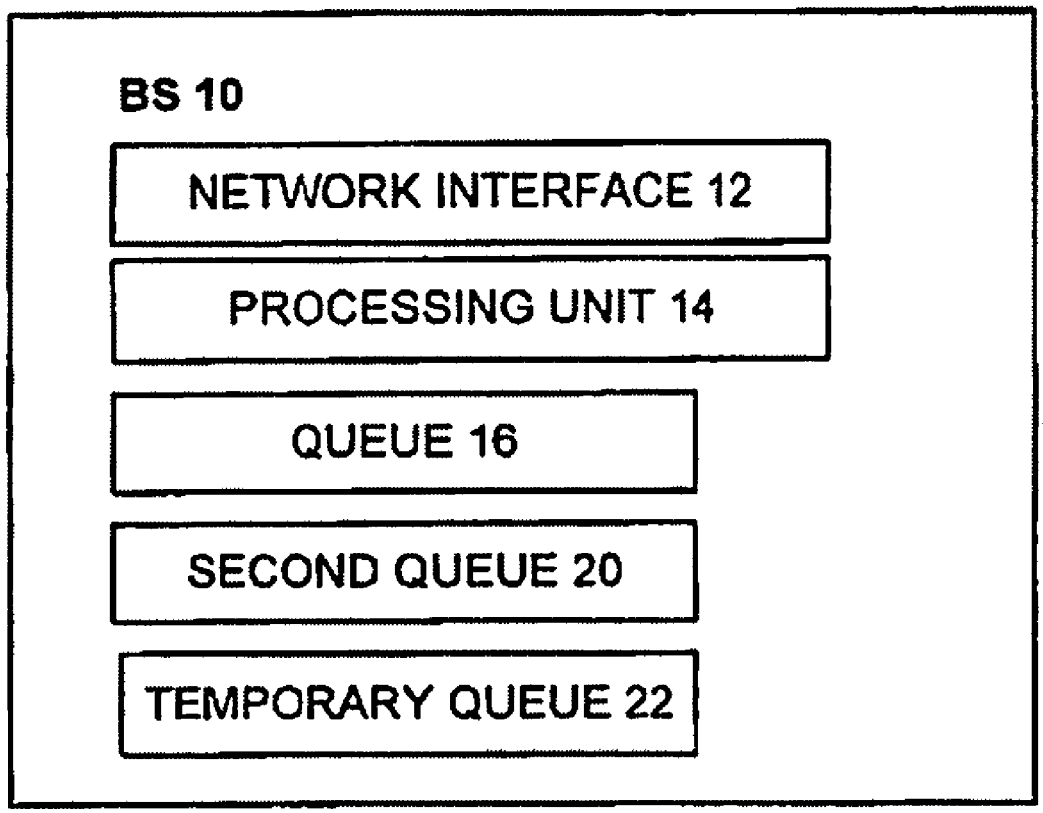
FIG. 7 is a block diagram of a BS of the present invention

Referring now to FIGS. 4, 5 and 7 thereof, there is shown a base station 10 (BS) in an OFDMA system which determines a modulation and coding scheme to use for a packet of a certain size to be transmitted by a Mobile station 11 (MS). The base station 10 comprises a processing unit 14 which determines a number of time-frequency resources required to transmit the packet for a modulation and coding scheme, determines an SINR based on the number of time-frequency resources used and available power at the mobile station 11, determines a transmission rate as a ratio of the packet size transmitted to the number of time-frequency resources used, sets a rate to zero if the determined SINR is lower than a threshold SINR required for the modulation and coding scheme, and selects the modulation and coding scheme with a highest transmission rate. The base station 10 comprises a memory storing modulation and coding schemes.

The memory may have a list of modulation and coding schemes that are dependent on the packet size and which are considered by the processing unit 14. The base station 10 may include a memory having a list of modulation and coding schemes that are the same for a range of packet sizes and which are considered by the processing unit 14.

Referring to FIGS. 4, 5 and 7, In one embodiment, there is a method in an OFDMA system to determine a modulation and coding scheme to use for a packet of a certain size to be transmitted by a Mobile station 11 (MS). The method comprises the steps of determining with a processing unit 14 a number of time-frequency resources required to transmit the packet for a modulation and coding scheme. There is the step of determining with the processing unit 14 an SINR based on the number of time-frequency resources used and available power at the mobile station 11. There is the step of determining with the processing unit 14 a transmission rate as a ratio of the packet size transmitted to the number of time-frequency resources used. There is the step of setting with the processing unit 14 a rate to zero if the determined SINR is lower than a threshold SINR required for the modulation and coding scheme. There is the step of selecting with the processing unit 14 the modulation and coding scheme with a highest transmission rate.

There may be a list of modulation and coding schemes in a memory considered by the processing unit 14 which is dependent on the packet size. The list of modulation and coding schemes considered may be the same for a range of packet sizes FIG. 4 shows the procedure followed by a BS to allocate a number of slots and a MCS given that a certain number of bytes need to be transmitted by a MS. The procedure takes into account the effects of power constraints on the MS and the resulting redundancy of MCS options described above.

In one embodiment, as shown in FIGS. 4, 5 and 7, there is a base station 10 in an OFDMA system to schedule transmissions by mobile station 11s. The base station 10 comprises a processing unit 14 which determines a modulation and coding scheme and number of time-frequency resources occupied by a packet if it is to be transmitted by a mobile station 11 in one transmission time interval, which determines modulation and coding schemes and total number of time-frequency resources occupied by the packet if it is fragmented and transmitted over two or more transmission time intervals, and schedules transmission over the number of transmission time intervals occupying a least number of time-frequency resources. The base station 10 comprises a memory in which the modulation and coding schemes are stored.

The modulation and coding scheme may be chosen by the processing unit 14 only if an SINR threshold is met. The number of transmission time intervals considered may be chosen by the processing unit 14 so as to meet a delay constraint on delivery of the packet. The base station 10 may include a queue 16 having packets and wherein transmission over two or more transmission time intervals is considered by the processing unit 14 only if there are other packets waiting in the queue 16 that may be used to occupy resources in a current transmission time interval. The base station 10 may include a queue 16 wherein transmission over two or more transmission time intervals is considered by the processing unit 14 only after a previous scheduling procedure has assigned all resources in the current transmission time interval to packets in the queue 16 and there are more packets awaiting transmission in the queue.

In one embodiment, as shown in FIG. 4, 5 and 7, there is a base station 10 to schedule transmissions by mobile stations 11. The base station 10 comprises at least one queue 16 for storing packets. The base station 10 comprises a processing unit 14 which makes a determination regarding a duration in terms of a number of frames starting with a current frame within which a packet must be transmitted and marks packets for which the duration is below a threshold as delay-sensitive packets, which schedules all delay sensitive packets, which schedules non-delay sensitive packets if time-frequency resources are still available, determines if all time-frequency resources are occupied and if there are more packets waiting in the queue 16 which indicates high system load, determines in high system load conditions if fragmenting any of the non-delay sensitive packets may reduce the number of resources used for the non-delay sensitive packet, and fragments packets that may be transmitted with fewer resources and uses the resulting unoccupied time-frequency resources to schedule more packets.

The base station 10 may include a network interface 12 which transmits non-delay sensitive packets in an order different from an order in which they entered the queue. The base station 10 may include at least a second queue 20 and wherein delay sensitive and non-delay sensitive packets are stored in separate queues. The base station 10 may include at least a second queue wherein fragments of packets waiting to be transmitted are stored in a separate queue.

In one embodiment, there is a method for a base station 10 in an OFDMA system to schedule transmissions by mobile stations 11, as shown in FIGS. 4, 5 and 7. The method comprises the steps of determining with a processing unit 14 a modulation and coding scheme and number of time-frequency resources occupied by a packet if it is to be transmitted by a mobile station 11 in one transmission time interval. There is the step of determining with the processing unit 14 modulation and coding schemes and total number of time-frequency resources occupied by the packet if it is fragmented and transmitted over two or more transmission time intervals. There is the step of scheduling with the processing unit 14 transmission over the number of transmission time intervals occupying a least number of time-frequency resources.

A modulation and coding scheme may be chosen by the processing unit 14 only if an SINR threshold is met. The number of transmission time intervals considered may be chosen by the processing unit 14 so as to meet a delay constraint on delivery of the packet. Transmission over two or more transmission time intervals may be considered by the processing unit 14 only if there are other packets waiting in a queue 16 that may be used to occupy resources in a current transmission time interval. Transmission over two or more transmission time intervals may be considered by the processing unit 14 only after a previous scheduling procedure has assigned all resources in the current transmission time interval to packets in the queue 16 and there are more packets awaiting transmission in the queue.

In one embodiment, there is a method for a base station 10 to schedule transmissions by mobile stations 11. The method comprises the steps of making a determination by a processing unit 14 regarding a duration in terms of a number of frames starting with a current frame within which a packet must be transmitted and marking packets for which the duration is below a threshold as delay-sensitive packets. There is the step of scheduling all delay sensitive packets with the processing unit 14. There is the step of scheduling non-delay sensitive packets with the processing unit 14 if time-frequency resources are still available. There is the step of determining with the processing unit 14 if all time-frequency resources are occupied and if there are more packets waiting in a queue 16 which indicates high system load. There is the step of determining with the processing unit 14 in high system load conditions if fragmenting any of the non-delay sensitive packets already scheduled may reduce the number of resources used for the non-delay sensitive packet. There is the step of fragmenting packets with the processing unit 14 that may be transmitted with fewer resources and using the resulting unoccupied time-frequency resources to schedule more packets.

Non-delay sensitive packets may be transmitted by a network interface 12 in an order different from an order in which they entered the queue. Delay sensitive and non-delay sensitive packets may be stored in separate queues 16. Fragments of packets waiting to be transmitted may be stored in a separate queue An exemplary embodiment of a scheduling algorithm at the BS as per this invention is shown in FIG. 5. The scheduling algorithm incorporates the following main aspects of the invention:
1. Fragmentation or transmission of packets to a user in separate radio frames to achieve higher spectral efficiency.
2. Using fragmentation or transmission in separate frames to enhance spectral efficiency only when there are more packets in the queue 16 than can be transmitted in current frame, i.e., at high loads.
3. Out-of-order transmission of packets in the queue 16 when packets are not delay-sensitive to enhance spectral efficiency.
4. Accounting for dependency of per-tone SINR and MCS selection on size of transmission to an MS and accounting for the resulting redundancy of MCS options for certain packet sizes.

Packets for all CIDs for all users are entered into a main queue (Q1) at the beginning. The packets are sorted in the queue in increasing order of tolerable delay. A user state is defined that is composed of three quantities, i.e. the MCS allocated to the user, the number of slots allocated to the user and the number of bytes to be transmitted by the user. This state is updated as packets are popped off the queue. The procedure in FIG. 4 is necessary to implement the decision boxes labeled D1 and D2 in FIG. 5. For both decision boxes, the procedure in FIG. 4 is used to determine if an MCS has a high enough SINR for transmission of the packet. If this is the case, additionally in decision box D1, it is determined if the required number of slots computed is available.

The algorithm described in FIG. 5 may be summarized as follows. There is a determination made regarding a delay threshold above which packets become delay-sensitive. The algorithm may be characterized as having three phases:
 In the first phase, packets that are delay sensitive are assigned empty slots with the number of slots assigned and the corresponding MCS depending on power constraints as specified in FIG. 4. If a delay-sensitive packet does not fit in the remaining slots, it may be fragmented to fill up all the slots. The fragments that are not scheduled for the current frame are entered into a temporary queue 22, Qf. If packets are not fragmented, but cannot be transmitted in the current frame at this stage, they are entered into another temporary queue 22, Q2. The goal in this first phase is to address all delay-sensitive packets.
 The second phase occurs if all delay-sensitive packets have been scheduled and there are still some slots available for allocation. In this case, remaining packets are assigned while maintaining the same MCS that has been currently assigned for each user. The purpose in trying to maintain the same MCS for an MS that was assigned previously to send delay-sensitive packets is to maintain the highest possible rate while serving the remaining packets in the queue. In this phase, packets may be fragmented and also may be transmitted out of order from the queue.
 The third phase occurs if all packets in the main queue (Q1) have been considered in the first two phases and there are still more slots available. If no slots were available, then the fragmentation and transmission of packets that may potentially have been packed or concatenated in separate frames, maximizes spectral efficiency while abiding by delay constraints. However, if more slots are available after phases 1 and 2, this clearly indicates a low load condition. Hence, it is not necessary to maximize rate using fragmentation and transmission of packets in separate frames. Instead, the remaining slots may be used to transmit any remaining packet fragments from queue Qf or packets from queue Q2. First, the packet fragments in queue Qf are considered. Where possible, fragmentation of packets is either undone or modified. Then, any remaining packets in Q2 are considered until all remaining slots are occupied or all packets have been allocated slots. If all slots are occupied before addressing all the packet fragments in queue (Qf), the packets that still remain fragmented help to maximize rate. If all slots are not occupied at the end of phase 3, then all packets have been served with no fragmentation necessary. Thus, the algorithm adapts to achieve the desired goals for both low and high load conditions.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method in an OFDMA system to determine a modulation and coding scheme to use for a packet of a certain size to be transmitted by a mobile station that is power limited whereby its maximum transient power is lower than that required to meet a power control criteria, comprising the steps of:
   determining by a processing unit, a number of time-frequency resources required to transmit the packet for a modulation and coding scheme;
   determining by the processing unit, a signal to interference plus noise ratio (SINR) based on the number of time-frequency resources used and available power at the mobile station which is power limited;
   determining by the processing unit, a size of the packet;
   determining by the processing unit, a transmission rate as a ratio of the packet size transmitted to the number of time-frequency resources used;
   setting with the processing unit, a rate to zero if the determined SINR is lower than a threshold SINR required for the modulation and coding scheme;
   selecting with the processing unit, the modulation and coding scheme as a function of effects of a number of used sub-carriers on SINR, the size of a packet, and which has a highest transmission rate; and
   fragmenting the packet by the processing unit into separated frames for transmission only when there are more packets in a queue than can be transmitted in a current frame.

2. The method of claim 1 wherein a list of modulation and coding schemes in a memory considered by the processing unit is dependent on the packet size.

3. The method of claim 2, wherein a list of modulation and coding schemes considered is the same for a range of packet sizes.

4. The method of claim 1 including the step of causing packets in a queue which are not delay sensitive to be transmitted out of order.

5. A base station in an OFDMA system which determines a modulation and coding scheme to use for a packet of a certain size to be transmitted by a mobile station that is power limited whereby its maximum transient power is lower than that required to meet a power control criteria, comprising:

a processing unit which determines a number of time-frequency resources required to transmit the packet for a modulation and coding scheme, determines signal to interference plus noise ratio (SINR) based on the number of time-frequency resources used and available power at the mobile station which is power limited, determines a transmission rate as a ratio of the packet size transmitted to the number of time-frequency resources used, determines a size of the packet, sets a rate to zero if the determined SINR is lower than a threshold SINR required for the modulation and coding scheme, selects the modulation and coding scheme as a function of effects of a number of used sub-carriers on SINR, the size of a packet and which has a highest transmission rate, and fragments the packet into separate frames for transmission only when there are more packets in a queue than can be transmitted in a current frame; and a memory which stores modulation and coding schemes.

6. The Base Station of claim 5 wherein the memory has a list of modulation and coding schemes that are dependent on the packet size and which are considered by the processing unit.

7. The Base Station of claim 5 including a memory having a list of modulation and coding schemes that are the same for a range of packet sizes and which are considered by the processing unit.

8. The base station of claim 5 wherein the processing unit causes packets in a queue which are not delay sensitive to be transmitted out of order.

* * * * *

UNITED STATES PATENT AND TRADEMARK OFFICE
CERTIFICATE OF CORRECTION

PATENT NO. : 8,144,720 B2
APPLICATION NO. : 12/429468
DATED : March 27, 2012
INVENTOR(S) : Koorapaty et al.

It is certified that error appears in the above-identified patent and that said Letters Patent is hereby corrected as shown below:

In Fig. 4, Sheet 4 of 6, delete "MSC?" and insert -- MCS? --, therefor.

In Column 9, Line 7, delete "In one" and insert -- in one --, therefor.

In Column 9, Line 37, delete "11s." and insert -- 11. --, therefor.

In Column 14, Line 10, in Claim 6, delete "Base Station" and insert -- base station --, therefor.

In Column 14, Line 14, in Claim 7, delete "Base Station" and insert -- base station --, therefor.

Signed and Sealed this
Fourteenth Day of August, 2012

David J. Kappos
*Director of the United States Patent and Trademark Office*